(12) United States Patent
Watermann et al.

(10) Patent No.: US 10,573,101 B2
(45) Date of Patent: Feb. 25, 2020

(54) DEVICE AND METHOD FOR MEASURING A DISTANCE IN A CONSTRUCTION MACHINE HAVING A CATERPILLAR CHAIN DRIVE, AND CONSTRUCTION MACHINE

(71) Applicant: MOBA Mobile Automation AG, Limburg (DE)

(72) Inventors: Marcus Watermann, Limburg (DE); Dominik Becher, Limburg (DE)

(73) Assignee: MOBA MOBILE AUTOMATION AG, Limburg (DE)

( * ) Notice: Subject to any disclaimer, the term of this patent is extended or adjusted under 35 U.S.C. 154(b) by 342 days.

(21) Appl. No.: 15/198,148

(22) Filed: Jun. 30, 2016

(65) Prior Publication Data

US 2017/0178428 A1    Jun. 22, 2017

(30) Foreign Application Priority Data

Jul. 1, 2015 (EP) .................................... 15174815

(51) Int. Cl.
| | | |
|---|---|---|
| G07C 5/08 | (2006.01) |
| B60K 35/00 | (2006.01) |
| B62D 55/06 | (2006.01) |
| G01D 5/36 | (2006.01) |
| G01D 5/48 | (2006.01) |
| E01C 19/48 | (2006.01) |

(52) U.S. Cl.
CPC ............ *G07C 5/0825* (2013.01); *B60K 35/00* (2013.01); *B62D 55/06* (2013.01); *G01D 5/36* (2013.01); *G01D 5/48* (2013.01); *E01C 19/48* (2013.01)

(58) Field of Classification Search
CPC ...... G07C 5/0825; B60K 35/00; B62D 55/06; G01D 5/36; G01D 5/48; E01C 19/48
See application file for complete search history.

(56) References Cited

U.S. PATENT DOCUMENTS

| | | | | |
|---|---|---|---|---|
| 4,198,758 A | * | 4/1980 | Eineichner ........... | G01B 11/043 198/349.95 |
| 5,044,820 A | | 9/1991 | Prang | |
| 7,133,742 B2 | * | 11/2006 | Cruysen ................. | A22B 7/001 700/226 |

(Continued)

FOREIGN PATENT DOCUMENTS

| | | |
|---|---|---|
| CN | 204085531 U | 1/2015 |
| EP | 0 199 829 A1 | 11/1986 |

(Continued)

OTHER PUBLICATIONS

Official Communication issued in corresponding Chinese Patent Application No. 201610516169.1, dated Nov. 26, 2018.

*Primary Examiner* — Lisa E Peters
(74) *Attorney, Agent, or Firm* — Keating & Bennett, LLP

(57) ABSTRACT

In order to measure a distance in a construction machine having a caterpillar chain drive, at least one contactless sensor for being arranged at a chassis of the construction machine is provided such that the contactless sensor is directed to a caterpillar chain of the caterpillar chain drive of the construction machine. An evaluating unit is connected to the contactless sensor and operative to determine a distance covered by the construction machine based on the signals received by the contactless sensor.

11 Claims, 9 Drawing Sheets

(56) References Cited

U.S. PATENT DOCUMENTS

| | | | |
|---|---|---|---|
| 7,734,397 B2 * | 6/2010 | Peterson | E02F 3/437 |
| | | | 172/2 |
| 7,942,604 B2 * | 5/2011 | Willis | B62D 7/026 |
| | | | 404/83 |
| 8,930,092 B2 * | 1/2015 | Minich | E01C 23/07 |
| | | | 701/50 |
| 8,985,250 B1 * | 3/2015 | Lussier | B62D 11/003 |
| | | | 180/9.1 |
| 9,205,828 B1 * | 12/2015 | Lombrozo | B60W 30/00 |
| 9,242,633 B2 * | 1/2016 | Forslow | B60W 10/24 |
| 2008/0253834 A1 * | 10/2008 | Colvard | E01C 19/006 |
| | | | 404/84.05 |
| 2010/0256874 A1 * | 10/2010 | Carresjo | B60C 23/0416 |
| | | | 701/48 |
| 2014/0244208 A1 | 8/2014 | Paulsen et al. | |

FOREIGN PATENT DOCUMENTS

| | | |
|---|---|---|
| EP | 0 388 819 A1 | 9/1990 |
| EP | 1 557 493 A2 | 7/2005 |
| GB | 2 255 640 A | 11/1992 |
| WO | 2012/168186 A1 | 12/2012 |

\* cited by examiner

DEVICE AND METHOD FOR MEASURING A
DISTANCE IN A CONSTRUCTION MACHINE
HAVING A CATERPILLAR CHAIN DRIVE,
AND CONSTRUCTION MACHINE

CROSS-REFERENCE TO RELATED
APPLICATION

This application claims priority from European Patent Application No. 15174815.9, filed Jul. 1, 2015, which is incorporated herein by reference in its entirety.

BACKGROUND OF THE INVENTION

The present invention relates to the field of construction machines comprising caterpillar chain drives (chain drives), for example road finishing machines or road milling machines, in particular to a device and to a method for measuring a distance or travel distance in a construction machine having a caterpillar chain drive, and to a construction machine having such a device.

Different approaches for measuring a distance covered by a construction machine are known. EP 0 388 819 A1, for example, discloses a path measuring means for a road finishing machine having a mounting plank, the path measuring means comprising a measuring wheel running along within the operating width of the mounting plank. Such a measuring wheel is of disadvantage since an additional moving element has to be provided in the construction machine, wherein the element gets dirty by the material processed, in particular when being used in a road finishing machine and, consequently, no longer runs along smoothly, the result being a corruption of the distance measured.

EP 1 557 493 A2 describes a method for operating a road finishing machine, wherein a position of the road finishing machine is determined via a navigation system either at the beginning or the end of an installing process or continuously. A real distance installed is determined from the positions and indicated while considering the course of the path, for example road bends or gradients. Of disadvantage with this method is the fact that measuring the distance covered is based solely on a satellite-supported navigation system, for example the GPS system and consequently is prone to errors in practice. Due to weather and environmental influences, a reliable GPS signal cannot always be ensured, for example when the road finishing machine passes below bridges or in tunnels, so that determining the position of the road finishing machine and, thus, establishing the distance covered and the actual distance installed is imprecise. Furthermore, it is of disadvantage that a course of the road to be installed needs to be known beforehand, since otherwise the distance cannot be calculated precisely.

WO 2012/168186 A1 describes a method for determining an area milled by a construction machine or a breakdown machine having a milling roll. The position of the machine is determined continuously by means of position determining means and a GNSS (global navigation satellite system) receiver or by means of a total station and a prism arranged on the machine. Subareas are calculated together with the width of the milling roll and summed up to form an overall area. Overlapping subareas, that is parts of areas processed several times, are subtracted again from this overall area so as to obtain an actually milled area. The information whether the milling drum is switched on or not, either has to be input manually by the operator or may be retrieved from the machine controller. With disturbances in receiving the GNSS signal, replacement data for missing or erroneous position data are calculated, which supplement or replace same. Thus, the replacement data are gained either from the past or further course of the distance or from the feed and steering angle data of the machine. Of disadvantage with this procedure is that the position determining means needs access to the machine parameters and/or needs to know the course of the distance covered by the machine so that, in the case of disturbances in receiving the GNSS signal, replacement data may be calculated. It is of further disadvantage that access to machine parameters is also necessitated for obtaining information as to whether the machine operates while moving or not, that is, for example, whether a milling drum is switched on or not. Alternatively, this information may also be input manually by an operator, which, however, is of disadvantage in that wrong calculations result when no information is input.

GB 2 255 640 A discloses a road finishing machine comprising a contactless approximation sensor arranged in the region of the front wheel and a spoke located in a detection region of the approximation sensor and arranged in the transverse direction of the road finishing machine behind the front wheel, the spoke being attached to the axis of the front wheel and turning uniformly with the front wheel when the road finishing machine moves. When the road finishing machine moves, due to the rotary movement of the spoke, impulses form at the approximation sensor, using which a distance covered by the road finishing machine may be measured. Furthermore, a switching element having a lever directed downwards and projecting into the material still to be processed is located in front of the spreading auger. Using this switching device, it may be determined whether the road finishing machine performs a forward movement or not and, resulting from this, a distance measurement is activated or deactivated. Of disadvantage with this system is the fact that, on the one hand, the switching device, in the region in front of the spreading auger, is a mechanical device and, consequently, prone to wear and, on the other hand, the sensor arranged in the region of the front wheel is of disadvantage since the sensor arrangement has to be installed behind the front wheel in a highly complicated manner and, thus, is difficult to access in the case of repair and may only be replaced while entailing big efforts. This results in a longer and inadvertent downtime of the road finishing machine. Additionally, due to its mounting position, the sensor arrangement is difficult to clean when dirty. Another disadvantage of this system is that, even with a defect in one of the two sensors or one of the two devices, that is either the switching device in front of the spreading auger or the sensor arrangement behind the front wheel, measuring or calculating the distance covered is no longer possible or will be erroneous until the defective device has been repaired.

Departing from this known technology, the object underlying the present invention is providing an improved approach for measuring and calculating a distance where the disadvantages of known implementations mentioned above are avoided and which allows easy, reliable and precise measurement and calculation of the distance.

SUMMARY

According to an preferred embodiment, a device for measuring a distance in a construction machine having a caterpillar chain drive may have: at least one contactless sensor for being arranged at a chassis of the construction machine such that the contactless sensor is directed to a caterpillar chain of the caterpillar chain drive of the construction machine; and an evaluating unit connected to the contactless sensor and operative to determine a distance covered by the construction machine based on the signals received by the contactless sensor.

According to another preferred embodiment, a construction machine may have: a caterpillar chain drive; a chassis; and a device as mentioned above, arranged detachably at the construction machine.

According to still another preferred embodiment, a method for measuring a distance in a construction machine having a caterpillar chain drive may have the steps of: detecting a movement of a caterpillar chain of the caterpillar chain drive of the construction machine in a contactless manner; and determining a distance covered by the construction machine based on the detected movement of the caterpillar chain.

The present invention provides a device for measuring a distance in a construction machine having a caterpillar chain drive, comprising:

at least one contactless sensor for being arranged at the chassis of the construction machine such that the contactless sensor is directed to a caterpillar chain of the caterpillar chain drive of the construction machine; and an evaluating unit which is connected to the contactless sensor and operative to determine a distance covered by the construction machine based on the signals received by the contactless sensor.

In accordance with preferred embodiments, it is provided for arranging the contactless sensor so as to detect, when the construction machine moves, chain links or elements of the caterpillar chain and gaps between the chain links of the caterpillar chain alternatingly and to generate signals indicating detection of a chain link and a gap.

The inventive device for measuring a distance in a construction machine is of advantage since a movement or standstill of the machine is detected reliably by the at least one contactless sensor arranged at the chassis and in the region of the caterpillar chain. In accordance with preferred embodiments, this sensor is directed to the caterpillar chain and, when the construction machine moves, alternatingly detects the chain links and the gaps. Impulse signals are generated by the caterpillar chain links moving while the construction machine moves, on the basis of which a path covered by the machine may be measured. In accordance with preferred embodiments it is provided for to establish whether the construction machine moves or not. When the construction machine stands still, this is detected by the sensor, and no distance measurement or calculation takes place, for example summing up individual pieces or portions of the distance covered is halted and only continued when the machine moves again.

Compared to a contactless sensor arranged behind the front wheel in accordance with GB 2 255 640 A, the inventive approach is of advantage since the sensor may be applied easily at the chassis of the construction machine, for example in the wheel housing above the caterpillar chain, and consequently is easily accessible. In the case of repair or for cleaning purposes, the sensor at this location is easily accessible. In addition, no additional turning parts, like a spoke which has to be fixed to the axis of the front wheel, are required.

In addition, the inventive approach is of advantage in that it operates independently of external position values and relies only on the actual movement of the caterpillar chain when detecting and/or measuring a distance covered. As has been mentioned before, there are known approaches wherein measuring a distance covered is done by adding up individual small portions or pieces of distances which have been determined using position values established continuously by position determining means, for example by using a GNSS receiver. The GNSS receiver may, for example, be a GPS (global positioning system) receiver. The problems entailed in these approaches are, for example, that, when the machine stands still, for example when the machine "persists" at one and the same position, a further movement of the machine is recognized due to variations of the GPS position data and, consequently, further values are summed up for a distance covered so that an approach which is based only on a satellite-supported system, results in erroneous distance measurements. The more frequently the machine stands still and then continues to drive, the greater the summation error resulting. Such a summation error also occurs when the machine drives or has to drive very slowly, for example when only a very small quantity of material is left in the material reservoir or hopper of a road finishing machine and only a few chains are available in the supply chain. These disadvantages are avoided in accordance with the invention by determining the distance on the basis of an actual movement of the caterpillar chain.

The inventive approach allows measuring and calculating a distance covered, for example when processing an area or ground by a construction machine, wherein the disadvantages of the systems described above are avoided. Compared to systems which are based on GNSS signals, the present invention allows continuing measuring the distance in the case of interferences of reception or failure of the GNSS system, for example when passing through a tunnel or below a bridge, without having to know the actual course of the path and without having to have access to the machine controller.

This allows implementing the present invention also as a so-called "hang-on" system, that is a system which is arranged detachably on the reconstruction machine and may, for example, be added onto different types of machines, in particular due to the fact that the inventive device, depending on the implementation of the evaluating unit, does no longer, or only to a limited extent, necessitate access to the construction machine or machine parameters of the construction machine.

In accordance with preferred embodiments, the device additionally includes at least one position determining means for determining the position of the construction machine, wherein it may be provided for in accordance with preferred embodiments that the position determining means determines the position of the construction machine using signals of a global navigation satellite system or a terrestrial system. The global navigation satellite system may, for example, be the GPS system. In the terrestrial system, a total station comprising a prism arranged on the construction machine may, for example, be provided, or a position of the construction machine may be determined using localization techniques from the mobile radio technology field, for example by GSM triangulation. A combination of the global navigation satellite system and terrestrial system is also possible, for example using the so-called "differential GPS", in order to correct the imprecisions in the position values contained in the signals of the global navigation satellite system. In accordance with further preferred embodiments, it may be provided for to correct the distance covered and/or the parameters on which calculating the distance is based, by the position data from the position means in predetermined spacings, wherein the parameters on which calculating the distance is based include a preset sum of the caterpillar element length and the length of a gap between two caterpillar elements. In accordance with preferred embodiments, the position determining means is part of a computer unit and/or an operating and display unit of the construction machine which may be connected operatively to the evaluating unit.

This implementation is of advantage since a further detection of the distance covered, in addition to measuring the distance, is possible due to the position signal by detecting the movement of the caterpillar chain, thereby again increasing the precision of the distance measurement. In accordance with preferred embodiments, the distance measured by the contactless sensor is corrected in regular spacings, such as, for example, every 10 m, similar to a procedure as is described in WO 98/12505 A1. The further the construction machine moves, the more precise is a distance measurement by the contactless sensor. When there is no GPS signal, for example when passing below bridges or in tunnels, the distance covered by the machine may be established by detecting the movement of the caterpillar chain, wherein the distance measurement or calculation is sufficiently precise, despite the lacking GPS signal.

In accordance with preferred embodiments, the device includes at least one acceleration sensor, arranged on a work tool of the construction machine, for detecting an operating state of the work tool. In accordance with preferred embodiments, the evaluating unit may be configured to combine the information as to whether the construction machine moves or not with the information from the acceleration sensor and with information on a current mounting width of a work tool of the construction machine in order to determine an area processed by the construction machine. In accordance with preferred embodiments, the acceleration sensor may be a single-axis or multi-axis sensor.

This implementation is of advantage since the information as to whether the machine moves or not, that is stands still, can be combined with the information from the acceleration sensor for detecting an operating state of the work tool, from which it may be deduced whether the machine works while moving, for example whether asphalt is mounted or milled off or not. When the machine stands still, in a road finishing machine, for example, the vibration for compressing the asphalt and, in a road milling machine, the milling drum for milling off the road surface are usually switched off. This may be detected by the acceleration sensor such that a calculation of the area processed by the machine may be performed easily based on this information in connection with information as to over which width the work tool of the machine is effective.

The acceleration sensor may be arranged anywhere on the work tool, for example on a mounting plank of a road finishing machine or laterally at a milling drum of a road milling machine. As has been mentioned, the acceleration sensor may be a single or multi-axis sensor in order to measure acceleration values in one or several directions, wherein such accelerations usually form when operating the work tool, for example by the vibration of the mounting plank when compressing the asphalt or by vibration when turning a milling drum in a road milling machine.

In accordance with preferred embodiments, the contactless sensor includes at least two sensor heads in a casing. In accordance with an preferred embodiment, the device includes at least two contactless sensors which are arranged on one side to the construction machine with a spacing therebetween, wherein, in accordance with preferred embodiments, a first contactless sensor is directed to a first region, for example a front region, of the caterpillar chain and a second contactless sensor to a second region, for example a back region, of the caterpillar chain. In addition, in accordance with preferred embodiments, it may be provided for to arrange a first contactless sensor on a first side of the construction machine and arrange a second contactless sensor on a second side of the construction machine opposite the first side, wherein the evaluating unit is configured to determine, while using the signals from the first contactless sensor and from the second contactless sensor, whether the construction machine moves straight ahead or in a bend.

Using several sensors or several sensor heads is of advantage since this allows a redundant detection of the movement of the caterpillar chain such that changing distances between the caterpillar elements, for example, may be considered. Also, the signals from the different sensors may be examined as to their plausibility, for example in order not to consider signals recognized as not being correct when measuring the distance. Using several sensors is also of advantage when dirt between the caterpillar elements is expected, so that a first sensor, for example, has problems in recognizing the differences between a caterpillar element and a gap, which, however, is possible by a different sensor, for example when the dirt falls off. An arrangement of the sensors on different sides of the machine is of advantage since the evaluating unit is easily able to also consider bends when measuring the distance.

In accordance with preferred embodiments, the device includes a bus system which connects the contactless sensor and the evaluating unit, and an interface configured to connect the bus system to a computer unit and/or an operating and display unit of the construction machine. In accordance with preferred embodiments, it may be provided for the evaluating unit to be configured to display the sensor values obtained by the contactless sensor on the operating and display unit of the construction machine. In accordance with further preferred embodiments, it may be provided for the interface to be configured to connect the bus system to communication means of the construction machine which is provided in order to allow wireless communication with at least another construction machine and/or a construction site office, wherein it may be provided for to send the data provided by the evaluating unit to a mobile computer or a construction site office.

The inventive device may thus be connected to existing terminals of the construction machine easily and without great effort so as to allow communication with the computer unit and/or an operating and display unit of the construction machine, for example to display the sensor values obtained or the distance covered generated therefrom or the area processed using the display unit and provide same to the operator of the construction machine. The data may also be transmitted to external positions, for example a construction site office, via the communication means, in order to protocol the construction progress as necessitated to a central place. In addition, due to the communication to other construction machines, it may be ensured that areas processed already are not processed again.

In accordance with preferred embodiments, the components of the device for measuring a distance are attached detachably to the construction machine.

This implementation is of advantage since the actual construction machine does not have to be modified, rather the components of the inventive device may easily be attached to the construction machine by suitable means and the evaluating unit may be easily connected to the control unit of the construction machine, for example using the interface mentioned before. Alternatively, the evaluating unit may also be implemented to be part of the computer unit or another unit of the construction machine. Thus, the inventive system is suitable in particular as an add-on system, as has been discussed before briefly.

Thus, in accordance with preferred embodiments, the present invention provides a device for measuring a distance covered when processing an area or ground by a construction machine, for example when applying asphalt or milling off a road surface, wherein, in accordance with preferred embodiments, the following components may be combined:

at least one contactless sensor arranged at the chassis of the construction machine and in the region of the caterpillar chain is provided in order to detect a movement of the caterpillar chain, for example in the form of an ultrasonic sensor, or an optical sensor, for example a laser sensor, at least one positioning means arranged at the construction machine is provided in order to determine a position via a satellite navigation system or a terrestrial system, and at least one acceleration sensor is arranged at the work tool of the construction machine in order to detect the operating state of the work tool.

In addition, the present invention provides a construction machine comprising:
a caterpillar chain drive;
a chassis; and
a device in accordance with the present invention, arranged detachably at the construction machine.

The inventive construction machine offers the advantages indicated above in connection with the inventive device.

Additionally, the present invention provides a method for measuring a distance covered by a construction machine having a caterpillar chain drive, comprising:

detecting a movement of a caterpillar chain of the caterpillar chain drive of the construction machine in a contactless manner; and determining a distance covered by the construction machine based on the detected movement of the caterpillar chain.

The inventive method for measuring a distance offers the advantages indicated above in connection with the inventive device.

In accordance with preferred embodiments, the method additionally includes determining the position of the construction machine and measuring the distance covered by the construction machine using the detected movement of the caterpillar chain at certain positions of the construction machine, wherein, in accordance with preferred embodiments, the position of the construction machine is determined using signals of a global navigation satellite system or a terrestrial system, wherein, in accordance with further preferred embodiments, it may be provided for to correct the distance having been detected using the movement of the caterpillar chain, by distance pieces determined using continuously determined position values of the construction machine.

Detecting the distance based on the signals of the contactless sensor which is directed to the caterpillar chain, and based on the position information is of advantage since this generates a calculation of the distance based, for example, on a recalculation and summation of the impulses generated by the sensor, the impulses being additionally supported and/or corrected by the continuously measured position values by the GNSS receivers.

In accordance with preferred embodiments, it is determined whether a work tool of the construction machine is activated, and the area processed by the construction machine is measured using the detected movement of the caterpillar chain and activation of the work tool, wherein activating, in accordance with preferred embodiments, includes detecting an acceleration work tool.

Based on the signals, detected by the sensor, relating to the distance covered and based on the information relating to the activation of the work tool and, advantageously, also based on a current mounting width of the work tool, the area processed by the construction machine, or the ground processed, may be detected easily. In preferred embodiments which additionally determine the position of the construction machine, this may additionally take place using the additional position values, for example from the GNSS receiver.

BRIEF DESCRIPTION OF THE DRAWINGS

Preferred embodiments of the present invention will be detailed subsequently referring to the appended drawings, in which.

DETAILED DESCRIPTION OF THE INVENTION

Figure 1:
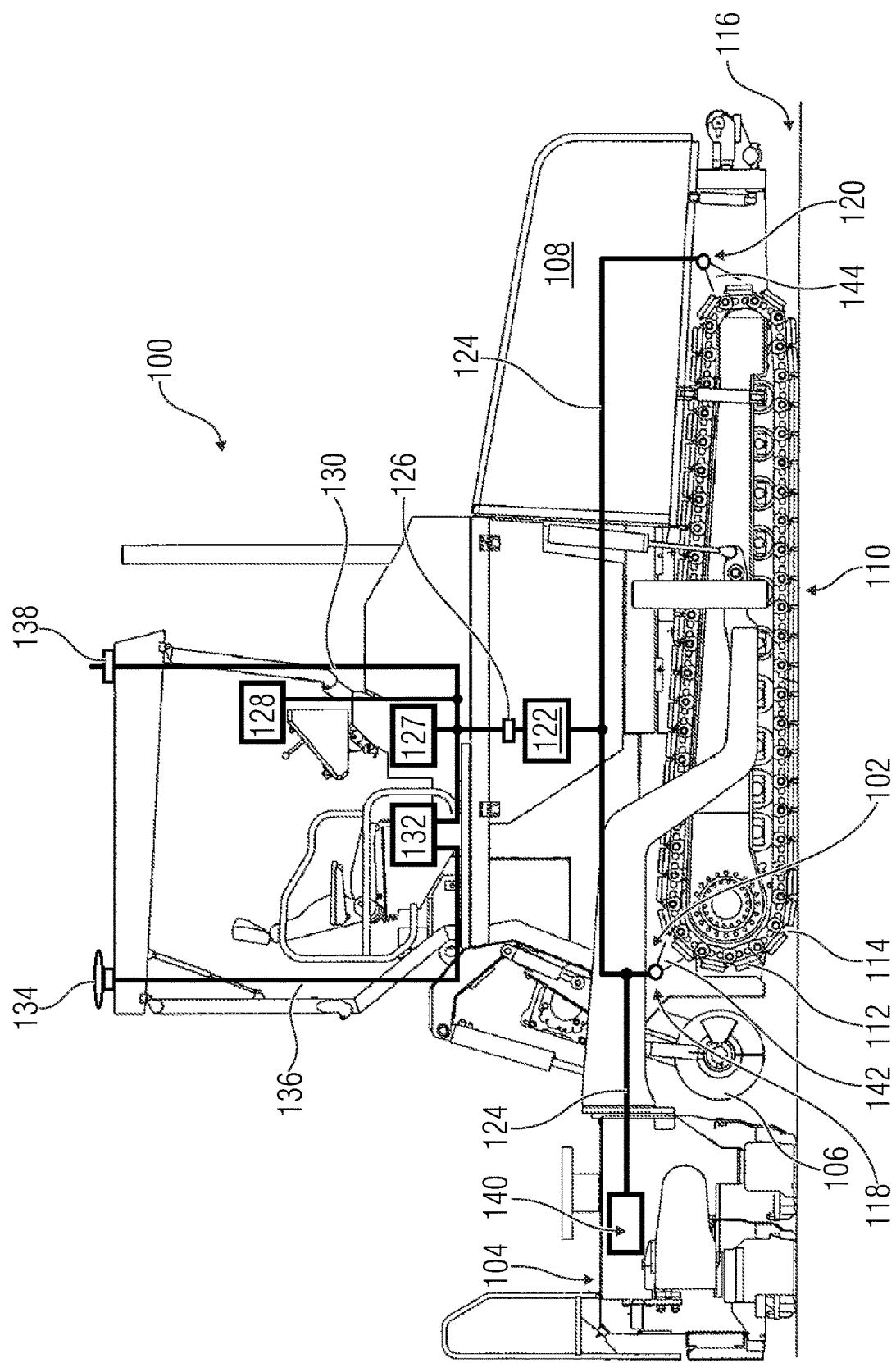
FIG. 1 shows a schematic illustration of a road finishing machine which comprises the inventive device in accordance with preferred embodiments.

Preferred embodiments of the present invention will be discussed below in greater detail referring to the appended drawings, wherein, in the appended drawings, same elements or elements of same effect are provided with same reference numerals. In addition, it is pointed out that the following description of preferred embodiments of the present invention uses a road finishing machine, wherein the present invention is not restricted to being applied in a road finishing machine. Rather, the present invention may be applied to any kind of construction machine comprising a caterpillar chain drive, for example road milling machines having a milling drum, bulldozers comprising a shield made of steel, piste caterpillars, excavators having a caterpillar running gear, track loaders, drilling devices or work platforms mounted on caterpillar drives, caterpillar milling machines and the like.

FIG. 1 is a schematic illustration of a road finishing machine 100 which comprises the inventive device in accordance with preferred embodiments in order to measure a distance covered by the road finishing machine 100. The road finishing machine 100 includes a chassis 102, a mounting plank 104, a spreading auger 106, a material hopper 108 and a caterpillar chain 110. The caterpillar chain 110 of the caterpillar chain drive of the road finishing machine 100 comprises a plurality of chain links 112 which are spaced apart from one another by a gap, wherein, in FIG. 1, such a space or gap between two neighboring chain links 112 is indicated by the reference numeral 114. The road finishing machine 100 in accordance with claim 1 is located on a ground 116, wherein a region on the ground 116 behind the road finishing machine is to be processed, for example by introducing an asphalt cover by the road finishing machine in a known manner.

The road finishing machine 100 includes the inventive device for detecting the distance or measuring a distance in accordance with an preferred embodiment. The device includes a first contactless sensor 118 and a second contactless sensor 120. In FIG. 1, the sensors 118 and 120 are illustrated schematically and are arranged at the chassis 102 of the road finishing machine 100, for example within a wheel housing in which the caterpillar chain 110 is arranged, for example via suitable attaching means, for example screws or latch devices. In addition, the device comprises an evaluating unit 122 which is also illustrated schematically in FIG. 1, and which may also be arranged at a suitable position of the construction machine, for example in the region of the driver cabin, but also at different positions, for example via a detachable screw or latch connection. The sensors 118 and 122 are connected to the evaluating unit 122 via a bus system 124, for example via a CAN bus. The bus 124 additionally includes an interface 126 in order to connect the inventive device in accordance with preferred embodiments to further control units or control components of the road finishing machine 100 or in order to allow the signals generated by the evaluating unit 122, which indicate the distance, to be read out. The road finishing machine 100 includes a control computer 127 and an operating and display device 128 which are connected via a system bus 130, for example the CAN bus. The evaluating unit 122 or inventive device for detecting the distance covered by the road finishing machine 100 may, in accordance with preferred embodiments, be connected to the bus 130 of the road finishing machine via the interface 126 such that the signals provided by the evaluating unit 122 are provided to the control computer 127 and/or to the operating and display device 128.

In accordance with other preferred embodiments, it may be provided for to implement the evaluating unit 122 to be part of the control computer 127.

Additionally, the road finishing machine 100 includes a position determining means 132, for example a GNSS position determining means, which is connected to a GNSS receiver 134 via a lead 136. Additionally, the position determining means 132 is connected to the control computer 127 of the road finishing machine 100 via the CAN bus 130. The position data may be provided from the position determining means 132 to the evaluating unit 122 using the interface 126. Instead of the GNSS position determining system just mentioned, other position determining systems may also be provided, either other satellite-supported systems or other terrestrial systems. Exemplarily, a total station having a prism arranged on the road finishing machine 100 may be provided, or else a mobile radio transmitter in order to perform GSM triangulation relative to the position of the road finishing machine 100. A combination of a satellite-supported and a terrestrial system may also be used, for example a differential GPS system.

Additionally, the road finishing machine 100 in accordance with FIG. 1 includes communication means 138, for example in the form of a transmit/receive antenna which is connected to the control computer 127 via the bus 130 and to the evaluating unit 122 via the interface 126. The communication means 138 allows bidirectional communication between the road finishing machine 100 and other construction machines or construction apparatuses located at a construction site, and/or communication to a central administration, for example a construction site office, in order to allow data to be communicated to the different positions, for example in order to transmit protocol data on the distance covered and the area installed to the construction site office.

In accordance with the preferred embodiment shown, the inventive device illustrated referring to FIG. 1 additionally comprises an acceleration sensor 140 which is illustrated schematically in FIG. 1 and which, in the preferred embodiment shown, is arranged above the mounting plank 104. On the basis of the output signals of the acceleration sensor 140, the evaluating unit 122 determines whether the mounting plank is active or not, that is whether the road construction machine 100 is just mounting asphalt material or not. The acceleration sensor 140 is connected to the evaluating unit 122 via the bus 124. The acceleration sensor 140 provided at the road finishing machine 100 in accordance with the preferred embodiment of the inventive device illustrated may also be attached laterally to the mounting plank 104. In addition, a multi-axis or single-axis sensor may be used. The sensor 140 detects the operating state of the mounting plank 104 in order to detect whether the road finishing machine 100 is operating, that is whether asphalt material is being applied or not.

In the preferred embodiment of the present invention illustrated in FIG. 1, the sensors 118 and 120 are contactless sensors which are directed to different regions of the caterpillar chain 110. Advantageously, the sensors 118 and 120 are ultrasonic sensors, wherein the first sensor 118 is arranged in the back region of the caterpillar chain 110, in front of the spreading auger 118, and the second sensor is arranged in the front region of the caterpillar chain 110, below the material hopper 108. Both sensors are oriented relative to their sensor detection regions 142, 144 in order to detect a movement of the caterpillar chain 110. When the road finishing machine 100 moves, the sensors 118 and 120 each detect the chain links 112 and the gaps 114 alternatingly and generate corresponding signals, for example impulse signals, which are discussed below in further detail.

The sensors 118, 120 and 140 are connected to one another and to the evaluating unit 122 via wiring 124, advantageously in the form of a bus system, for example the CAN bus. A connection to the control computer 127 is realized via the interface 126 so that signals and messages can be exchanged via the bus system. Further components of the road finishing machine 100, that is the operating and display unit 128, the position determining means 132 and the communicating means 138 are connected to the control computer 127, again via wiring 130, for example in the form of a bus system, in order to allow communication of the components among one another. The operating and display unit 128 serves as an interface between a machine operator or driver and, in accordance with preferred embodiments, is configured to display values measured, calculated and transmitted via the bus system 124, 130. The communicating means 138 serves to transmit values measured, calculated and obtained via the bus system to further machines or external locations, for example a construction site office, for example via a satellite or mobile radio distance.

Figure 2:
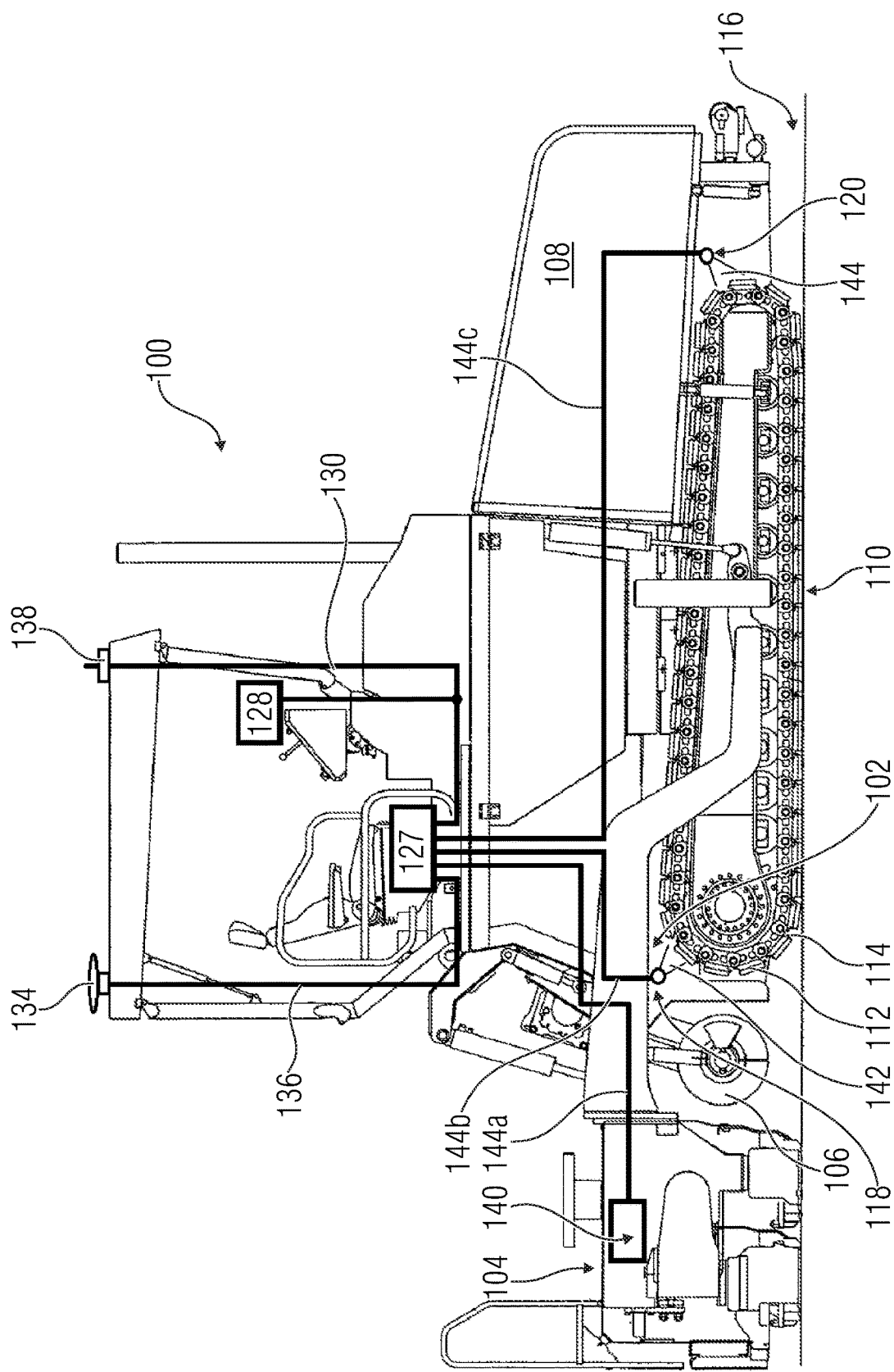
FIG. 2 shows an alternative implementation of the inventive device in accordance with a further preferred embodiment.

FIG. 2 shows an alternative implementation of the inventive device in accordance with a further preferred embodiment. FIG. 2 also shows a road finishing machine which, in its structure, corresponds to the row finishing machine of FIG. 1 so that there is no repeated description of the components of the road finishing machine described already referring to FIG. 1. In the preferred embodiment illustrated in FIG. 2, the evaluating unit of the inventive device is implemented to be part of the control computer 127 of the construction machine 100, wherein the control computer 127, in the example shown, additionally contains the position determining means. The GNSS receiver 134 is, as is the case in FIG. 1, connected to the control computer 127 via the lead 136. Additionally, the bus 130 described already referring to FIG. 1 is illustrated via which the control computer 127, the operating and display device 128 and the communicating means 138 are connected among one another. The device in accordance with the implementation in accordance with FIG. 2 comprises the same sensors as does FIG. 1, wherein, however, these are not connected among one another via a common bus system nor to the evaluating unit (control computer 127), but via respective separate wirings 144a to 144c. This allows using sensors which are, for example, not capable of cooperating with a bus, for example such sensors not having an interface for a terminal to a bus system, or such sensors having only an analog interface.

The position determination located in the control computer 127 causes the position of the road finishing machine 100 to be established continuously via the GNSS receiver 134 and allows correction of the distance measured by the contactless sensors 118, 120, for example by correcting the distance measured by the sensors 118, 120 in regular spacings of 10 m of a distance covered, for example by correcting a preset spacing or the last set spacing of the chain links 112 which is then used as a basis for a subsequent calculation of the distance covered.

Instead of the implementation as illustrated in FIG. 2 wherein the control computer 127 contains the position determining means, in other preferred embodiments, it may be provided for to integrate the control computer into the operating and display unit 128. In such an implementation, the position determining means may also be implemented to be part of the control and display unit 128. Alternatively, the position determining means may, similarly to FIG. 1, be provided and, additionally, the function of the evaluating unit of the inventive device may be integrated into the position determining means.

Only one side of the road finishing machine 100 and the drive arranged on that side have been illustrated referring to FIGS. 1 and 2. A corresponding drive is located on the opposite side and, in accordance with preferred embodiments, it may be provided for to provide an arrangement of the contactless sensors, corresponding to the implementation in accordance with FIGS. 1 and 2, on the opposite side as well such that both caterpillar chains of the road finishing machine 100 are monitored via corresponding sensors, thereby additionally offering a way of recognizing bends.

Detecting the distance covered by the road finishing machine 100 when same moves will now be discussed in greater detail referring to FIG. 3, FIG. 3a being an enlarged illustration of the back part of the caterpillar chain 110 of the road finishing machine 100 of FIG. 1 and FIG. 3b being a diagram illustrating the signals generated by the sensor 118.

Figure 3A:
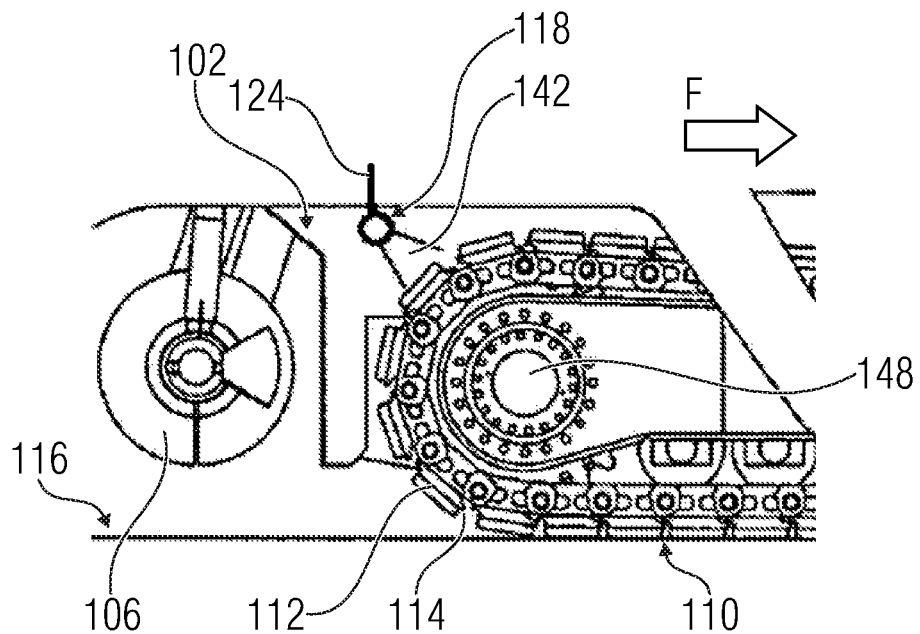
FIG. 3a shows an enlarged illustration of the back part of the caterpillar chain of the road finishing machine of FIG. 1.

FIG. 3a illustrates the sensor 118 which is arranged in the type described referring to FIG. 1 and connected to the CAN bus 124. In FIG. 3a, the arrow F indicates a direction of travel of the road finishing machine 100, and additionally, the back part of the caterpillar chain 110 is illustrated, wherein the individual chain links 112 and the gap 114 between these chain links may be recognized more clearly in the enlarged illustration. In addition, it is to be recognized that the detection region 142 of the sensor 118 is directed to the back region of the caterpillar chain 110, that is to a position where the caterpillar chain 110 is guided around the wheel 148, and consequently there is a fixed distance 114, known due to the guiding of the chain in the region of the wheel 48, between the chain links 112. In the region where the caterpillar chain 114 is not guided by the wheel 148, the distance is, as can be seen from FIG. 3a, smaller and may also change along the movement of the caterpillar chain such that advantageously detection of the caterpillar chain 110 is performed in the region of guiding the caterpillar chain.

Figure 3B:
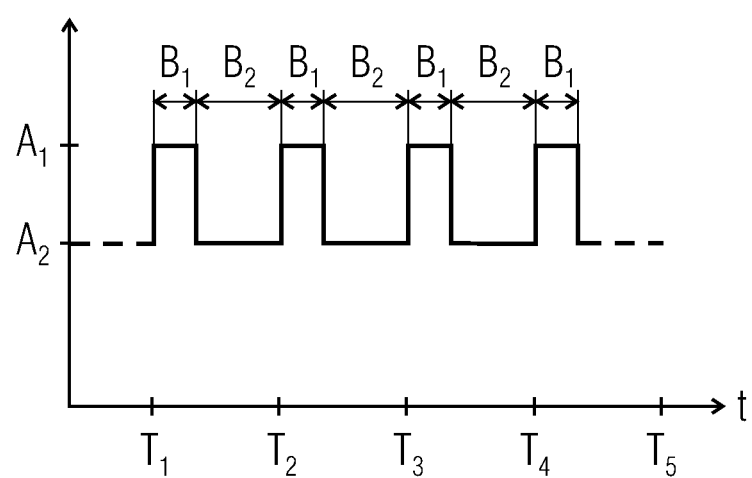
FIG. 3b shows a diagram illustrating the signals generated by the sensor.

When the road finishing machine 100 moves, the caterpillar chain 110 is moved either in a clockwise or counter-clockwise direction, wherein, in FIG. 3, a movement in a clockwise direction in the direction of travel F is assumed. The movement of the caterpillar chain 110 causes an output signal of the sensor 118, as is illustrated referring to FIG. 3b. The output signal of the sensor 118, for example of an ultrasonic sensor, basically is a rectangular signal forming when the road finishing machine 100 moves at uniform or approximately constant speed.

As has been mentioned before, the gap 114 between two chain links 112 is very small in a region where the caterpillar chain 110 rests on the ground 116, for example, whereas the gap 114 between two chain links 112 is enlarged in the redirecting region 148 where the sensor 118 is arranged and, due to the guiding 148, comprises a defined spacing. The sensor 118, for example in the form of an ultrasonic sensor, when the caterpillar chain 110 moves, detects the different distances to the caterpillar chain 110 which result from the fact that a distance between the sensor 118 and the caterpillar chain 110 is smaller when a chain link 112 moves past the sensor 118, and the distance is greater in the gap 114. In FIG. 3b, the spacing between the sensor 118 and the caterpillar chain 110 is indicated along the Y-axis and the signal output by the sensor 118 shows a first, greater spacing $A_1$ when a gap 114 passes the sensor 118, and a second signal A2 lower compared to the first signal, which indicates a smaller spacing when a chain link 112 moves past the sensor 118. The time is indicated along the X-axis and the signal course shows for which duration a gap $B_1$ or a chain link $B_2$ has been detected. In other words, the gap 114 detected by the sensor 118 between two chain links 112 corresponds to a measured spacing $A_1$ and an impulse width $B_1$, and the chain link 112 of the caterpillar chain 110 detected by the sensor 118 corresponds to a measured spacing $A_2$ and an impulse width $B_2$. While using the signal course shown in FIG. 3b, the evaluating unit 122 (see FIG. 1) determines the distance covered by this road finishing machine 100 within a predetermined time unit, by adding up, with each count of the signal course shown in FIG. 3b, the sum consisting of a preset length or last set length of a chain link 112 and a gap 114 between two neighboring chain links 112 of the caterpillar chain 110 resting on the ground 116. The length of a chain link 112 in a road finishing machine is, for example, roughly 15 cm and the gap 114 between two neighboring chain links 112 in a caterpillar chain 110 resting on the ground 116 is roughly 1.5 cm. Correspondingly, with each count of the signal course shown in FIG. 3b, 16.5 cm are added to the distance covered already and stored.

When using two sensors 118 and 120, the resolution is increased by this, that is with each count generated by the two sensors 118 and 120, half of the sum consisting of the preset length or last set length of a chain link 112 and the gap 114 between two neighboring chain links 112 of the caterpillar chain 110 resting on the ground 116 is added up. With a sum of the length of a chain link 112 and the gap 114 of roughly 16.5 cm, as indicated above, consequently only 8.25 cm have to be added to the distance covered already and stored with each count of the signal course shown in FIG. 3b.

In addition, a redundant arrangement is achieved when using two sensors 118 and 120, wherein errors when detecting the chain links 112 or the gaps, for example due to chain links broken away or dirt in the gaps, can be corrected. Additionally, when one of the two sensors 118 or 120 breaks down or is defect, the signals or count of the respective other sensor may be used for calculating the distance.

Figure 4A:
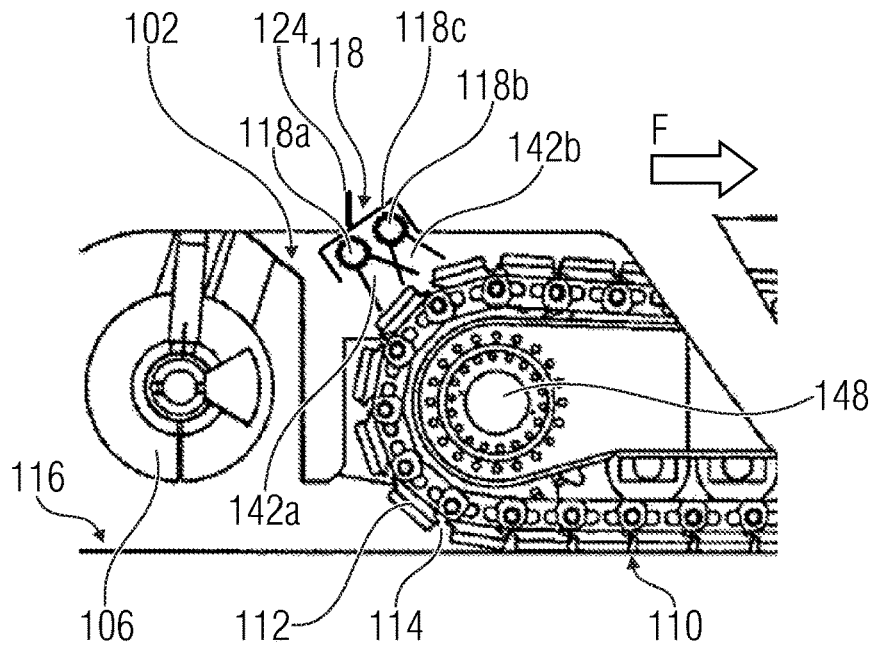
FIG. 4a shows the arrangement of a two-headed sensor in accordance with an preferred embodiment.
Figure 4B:
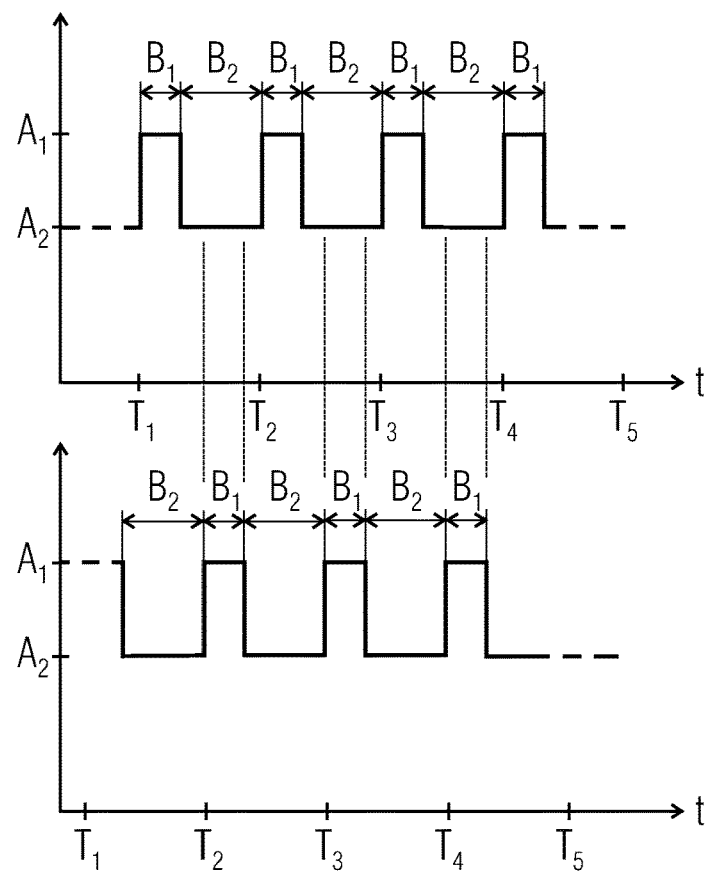
FIG. 4b shows the output signals obtained by the two sensors.

FIG. 4 shows measuring the distance covered by a road finishing machine, while using a double-headed sensor in accordance with another preferred embodiment of the inventive device. FIG. 4a shows the arrangement of a double-headed sensor in accordance with this preferred embodiment, and FIG. 4b shows the output signals obtained by the two sensors.

FIG. 4a shows an arrangement of the sensor 118 in the back region of the caterpillar chain 110, similarly to FIG. 3a, wherein the sensor 118 includes two sensor heads 118a and 118b which are arranged within a common casing 118c of the sensor 118. The sensor heads 118a and 118b are arranged offset such that the detection regions 142a, 142b thereof are partially overlapping. Both sensor heads 118a and 118b are oriented such that a movement of the caterpillar chain 110 is detected by both sensor heads 118a, 118b. When the road finishing machine 100 moves in the direction of travel F, the caterpillar chain 110 is moved in a clockwise direction, resulting in the output signals shown in FIG. 4b, wherein the top diagram in FIG. 4b illustrates the output signal relating to the spacing values, as detected by the sensor head 118a, and the bottom diagram represents the sensor values relating to the spacing values from the sensor head 118b.

Similarly to the diagram shown in FIG. 3b, in the diagram in accordance with FIG. 4b, the spacings $A_1$, $A_2$ are indicated on the X axis, and several points in time $T_1$ to $T_5$ on the Y axis, where a change each takes place from the measured spacing $A_2$ (spacing to the chain link 112) to the measured spacing $A_1$ (spacing to the chain through the gap 114), that is a change between the chain link 112 and the gap 114 between the two chain links 112. As may be recognized in the diagram in accordance with 4b, due to the offset arrangement of the sensor heads 118a and 118b, there is a temporal offset between signal or impulse courses such that the gap 114 between two chain links 112 is recognized by the sensor head 118a between the points in time $T_1$ and $T_2$ (spacing value $A_1$, impulse width $B_1$), whereas the sensor head 118b recognizes a chain link 112 between these points in time (spacing value $A_2$, impulse width $B_2$).

Comparable to the above situation when using two sensors 118 and 120 in the front and back regions of the road finishing machine, by using a double-headed sensor, the resolution of the distance calculation is increased, that is with each count generated by the two sensor heads 118a and 118b, half of the sum including a preset length or last set length of a chain link 112 and the gap 114 between two neighboring chain links 112 of the caterpillar chain 110 resting on the ground 116 is added up. With a sum, as indicated above, of the length of a chain link 112 and the gap 114 of roughly 16.5 cm, only 8.25 cm have to be added to the distance path covered already and stored with each count of the sensor heads.

Figure 5B:
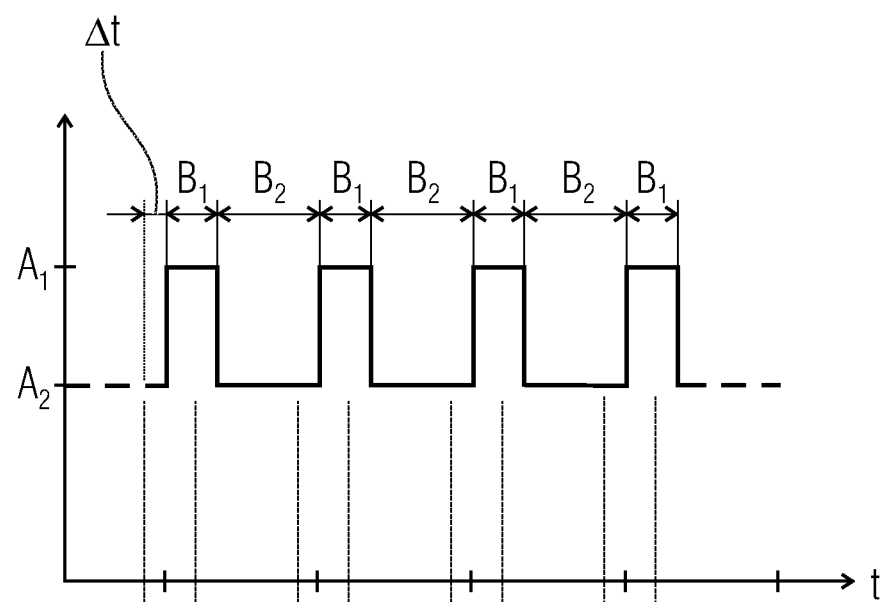
FIGS. 5a and 5b show the output signals obtained by two sensors when the construction machine drives forward.
Figure 5A:
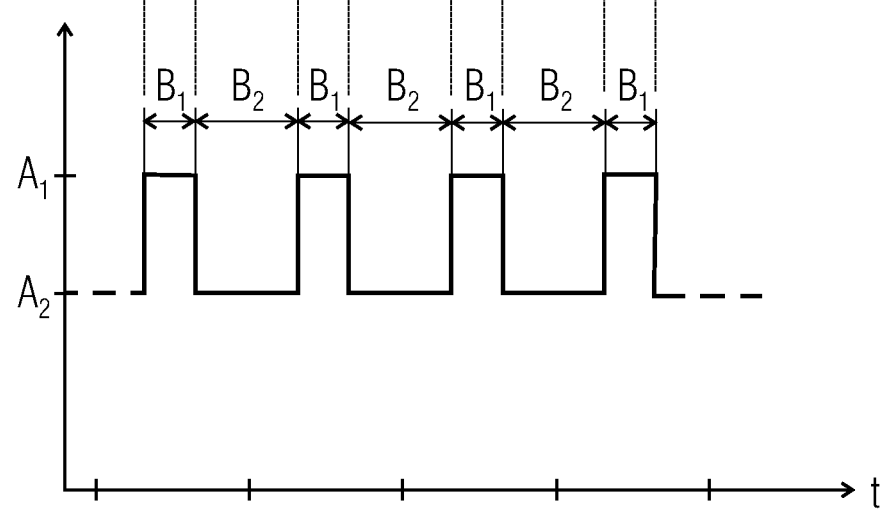
Figure 6B:
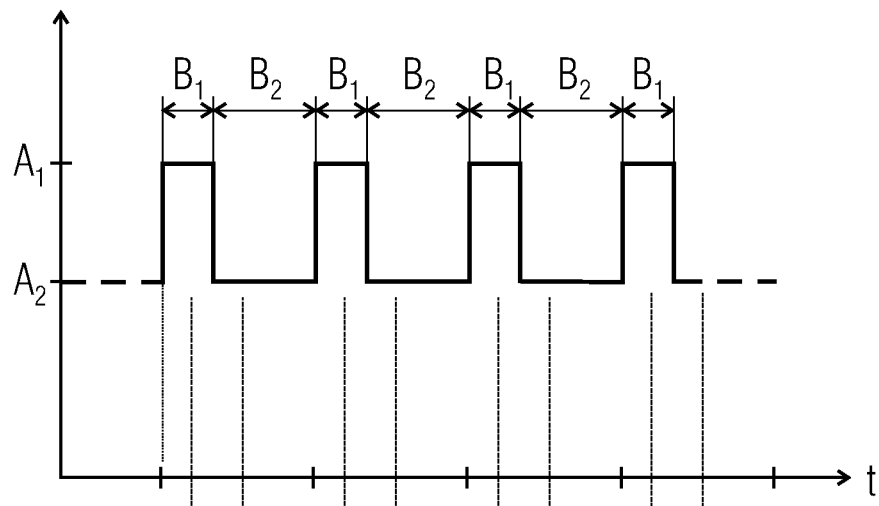
FIGS. 6a and 6b show the output signals obtained by two sensors when the construction machine drives backward.
Figure 6A:
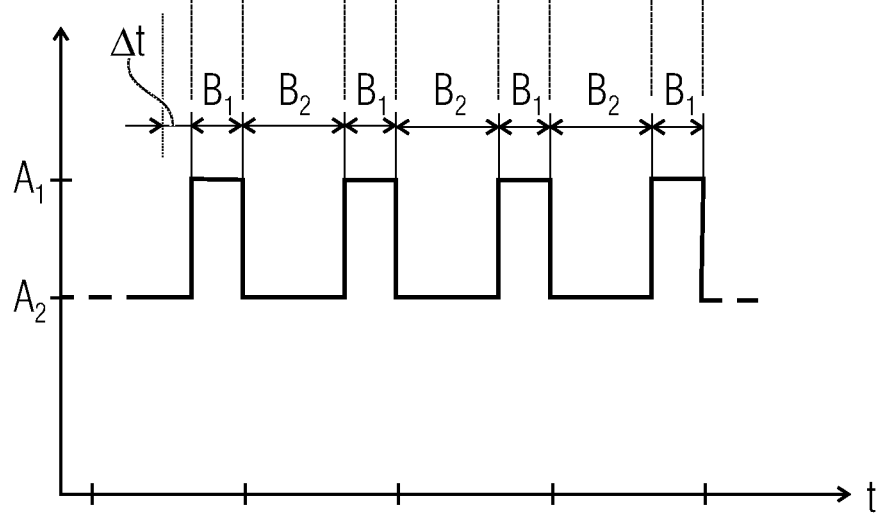

When, in the preferred embodiments described above, two sensors are used (see, for example, FIG. 4), either as two individual sensors or as two sensor heads in one casing, FIG. 4b exemplarily shows a signal course for an arrangement in which one sensor detects the chain link (A2/B2) and the other one, at the same time, the gap between two chain links (A1/B1). In other preferred embodiments, the sensors may be arranged such that a forward-backward travel of the machine may be detected using the signals, comparable to a shaft encoder. Here, the sensors are arranged such that they simultaneously detect, at least at times, a chain link and a gap so that the signal courses shown in FIG. 4b are shifted to one another such that the gaps between two chain links (A1/B1) overlap at the edges. FIGS. 5a and 5b show the output signals obtained by two sensors when the construction machine moves forward, wherein FIG. 5a shows the output signal of a first sensor which is arranged behind a second sensor in the direction of travel. FIG. 5b shows the output signal obtained by the second sensor. The signals B1 of the first sensor (FIG. 5a) representing a gap partly overlap the corresponding signals B1 from the second sensor (FIG. 5b) as is indicated by the offset Δt. The signals of the second sensor are delayed by the offset Δt compared to the signals of the first sensor, from which the evaluating unit recognizes a forward movement of the machine. FIGS. 6a and 6b show the output signals obtained by the two sensors when the construction machine moves backwards, wherein FIG. 6a shows the output signal of the first sensor and FIG. 6b shows the output signal of the second sensor, which are also shifted by the offset Δt. In FIGS. 6a and 6b, the signals of the first sensor are delayed by the offset Δt relative to the signals of the second sensor, from which the evaluating unit recognizes a backward movement of the machine.

Figure 7:
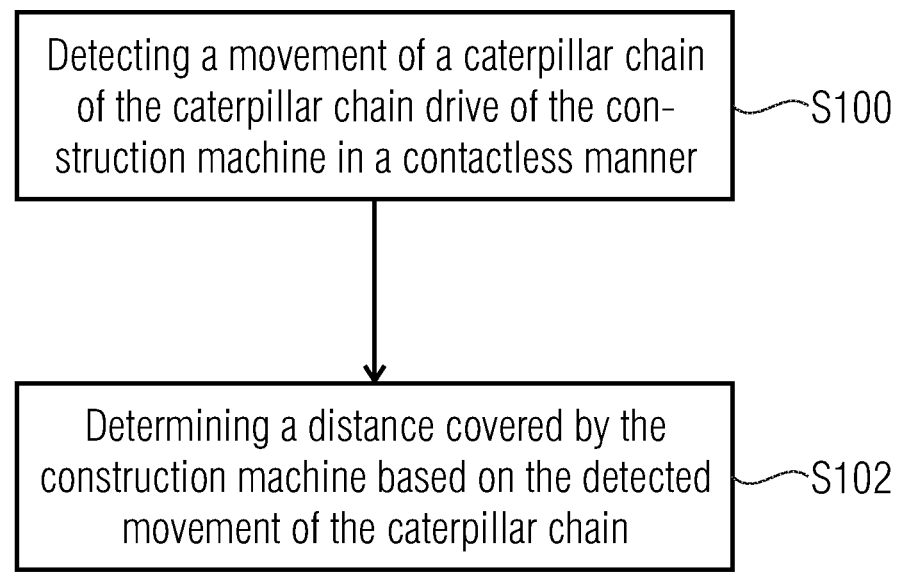
FIG. 7 shows a flowchart of the method for measuring a distance in a construction machine in accordance with an preferred embodiment of the present invention.

FIG. 7 shows a flow chart of the method for measuring a distance in a construction machine in accordance with an preferred embodiment of the present invention. In a first step S100, the movement of a caterpillar chain of the caterpillar chain drive of the construction machine, for example of a road finishing machine, as has been described referring to FIG. 1 and referring to FIG. 2, is detected in a contactless manner so that, in step S102, the distance covered by the construction machine may be determined based on the detected movement of the caterpillar chain.

Figure 8:
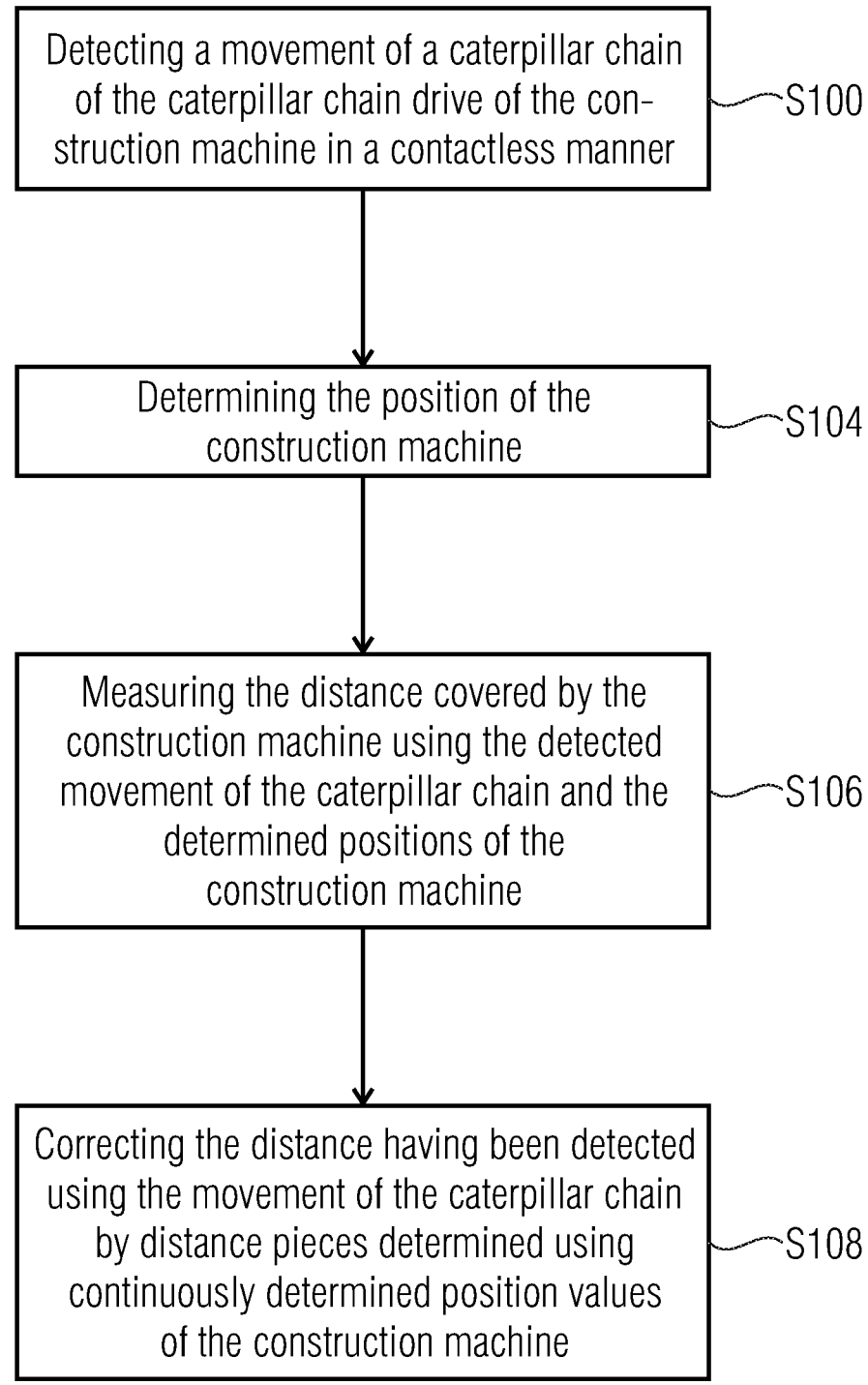
FIG. 8 shows a flowchart in accordance with another preferred embodiment of the inventive method.

FIG. 8 shows a flow chart in accordance with another preferred embodiment of the inventive method. Similar to FIG. 7, in step S100, at first a movement of the caterpillar chain is detected in a contactless manner. Additionally, in accordance with the preferred embodiment illustrated, in step S104, the position of the construction machine is detected, for example via satellite navigation or the like. In step S106, the distance covered is measured using the detected movement of the caterpillar chain and using the determined positions of the construction machine at predetermined points in time. In accordance with the preferred embodiment described, optionally, it may be provided for in step S108 to correct the distance having been detected using the movement of the caterpillar chain, based on the position values of the construction machine.

Figure 9:
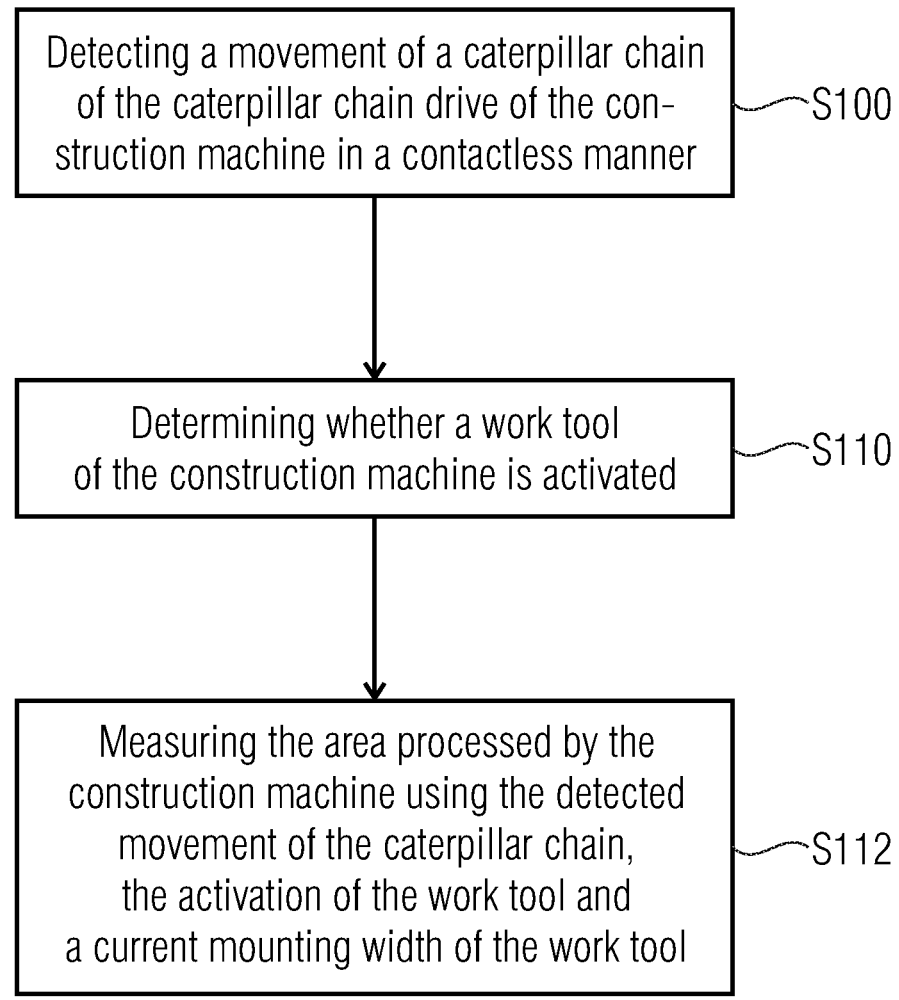
FIG. 9 shows a flowchart which illustrates another preferred embodiment of the inventive method.

FIG. 9 shows a flow chart which represents another preferred embodiment of the inventive method. Similar to the approaches in accordance with FIGS. 7 and 8, in FIG. 9, too, at first the movement of a caterpillar chain is detected in a contactless manner in step 100. In a subsequent step S110, it is determined whether a work tool of the construction machine is activated, for example by detecting a vibration or acceleration thereof, so that, in step S112, the area processed by the construction machine may be measured, using the detected movement of the caterpillar chain, the activation of the work tool and a current mounting width of the work tool which changes in dependence on which area is to be processed, for example. In a road finishing machine, a narrow strip may, for example, be asphalted, for example when producing a bicycle path, or a wide strip, for example when producing the surface for a lane of a road. The corresponding current width the work tool is used at enters into the calculation of the area processed. In the preferred embodiment shown in FIG. 9, it may additionally be provided for to also consider the steps of the preferred embodiment shown referring to FIG. 8, that is the correction of the distance detected by the contactless detection of the movement of the caterpillar chain.

It has been mentioned in the preferred embodiments described above that a sensor is directed to a back end of the caterpillar chain and that another sensor may be directed to a front end of the caterpillar chain. However, the present invention is not restricted to this, rather, a sensor or several sensors may be arranged anywhere along the caterpillar chain and directed to same. A sensor may, for example, be arranged in a region between the axes and be directed to that part of the caterpillar chain resting on the ground or to that part of the caterpillar chain spaced apart from the ground.

Further preferred embodiments of the invention will be described below.

A first preferred embodiment includes a device for measuring a distance in a construction machine comprising a caterpillar chain drive, comprising at least one contactless sensor for being arranged at a chassis of the construction machine such that the contactless sensor is directed to a caterpillar chain of the caterpillar chain drive of the construction machine; and an evaluating unit connected to the contactless sensor and operative to determine a distance covered by the construction machine based on the signals received by the contactless sensor.

A second preferred embodiment includes a device in accordance with the first preferred embodiment, wherein the contactless sensor is arranged to detect, when the construction machine moves, alternatingly chain links of the caterpillar chain and gaps between the chain links of the caterpillar chain and to generate signals indicating detection of a chain link and a gap.

A third preferred embodiment includes a device in accordance with the first or second preferred embodiment, comprising at least one position determining means for determining the position of the construction machine.

A fourth preferred embodiment includes a device in accordance with the third preferred embodiment, wherein the position determining means is configured to determine the position of the construction machine using signals of a global navigation satellite system or a terrestrial system.

A fifth preferred embodiment includes a device in accordance with the third or fourth preferred embodiment, wherein the evaluating unit is configured to correct, in predetermined spacings, the distance covered by position data from the position determining means.

A sixth preferred embodiment includes a device in accordance with the third, fourth or fifth preferred embodiment, wherein the position determining means is part of a computer unit and/or an operating and display unit of the construction machine, which may be connected operatively to the evaluating unit.

A seventh preferred embodiment includes a device in accordance with any of the preceding preferred embodiments, comprising at least one acceleration sensor, arranged at a work tool of the construction machine, for detecting an operating state of the work tool.

An eighth preferred embodiment includes a device in accordance with the seventh preferred embodiment, wherein the evaluating unit is configured to combine the information as to whether the construction machine moves or not with the information from the acceleration sensor and information on a current mounting width of a work tool of the construction machine in order to determine an area processed by the construction machine.

A ninth preferred embodiment includes a device in accordance with the seventh or eighth preferred embodiment, wherein the acceleration sensor includes a single or multi-axis sensor.

A tenth preferred embodiment includes a device in accordance with any of the preceding preferred embodiments, wherein the contactless sensor comprises at least two sensor heads in a casing.

An eleventh preferred embodiment includes a device in accordance with any of the preceding preferred embodiments, comprising at least two contactless sensors arranged on one side of the construction machine with a spacing to one another.

A twelfth preferred embodiment includes a device in accordance with the eleventh preferred embodiment, wherein a first contactless sensor is directed to a front region of the caterpillar chain and a second contactless sensor is directed to a back region of the caterpillar chain.

A thirteenth preferred embodiment includes a device in accordance with any of the preceding preferred embodiments, comprising at least two contactless sensors, wherein a first contactless sensor is arranged on a first side of the construction machine, and wherein a second contactless sensor is arranged on a second side of the construction machine opposite the first side, wherein the evaluating unit is configured to determine, using the signals from the first contactless sensor and from the second contactless sensor, whether the construction machine travels straight ahead or makes a bend.

A fourteenth preferred embodiment includes a device in accordance with any of the preceding preferred embodiments, comprising: a bus system which connects the contactless sensor and the evaluating unit, and an interface configured to connect the bus system to a computer unit and/or an operating and display unit of the construction machine.

A fifteenth preferred embodiment includes a device in accordance with the fourteenth preferred embodiment, wherein the evaluating unit is configured to display the sensor values obtained by the contactless sensor on the operating and display unit of the construction machine.

A sixteenth preferred embodiment includes a device in accordance with the fourteenth or fifteenth preferred embodiment, wherein the interface is additionally configured to connect the bus system to communicating means of the construction machine provided to allow wireless communication to at least one other construction machine and/or a construction site office.

A seventeenth preferred embodiment includes a device in accordance with the sixteenth preferred embodiment, wherein the communication means is configured to transmit the data provided by the evaluating unit to a mobile computer or to the construction site office.

An eighteenth preferred embodiment includes a device in accordance with any of the preceding preferred embodiments, wherein the components of the device for measuring a distance are attached detachably at the construction machine.

A nineteenth preferred embodiment includes a construction machine comprising: a caterpillar chain drive; a chassis; and a device in accordance with any of the preceding preferred embodiments, detachably arranged at the construction machine.

A twentieth preferred embodiment includes a method for measuring a distance of a construction machine comprising a caterpillar chain drive, comprising: detecting a movement of a caterpillar chain of the caterpillar chain drive of the construction machine in a contactless manner; and determining a distance covered by the construction machine based on the detected movement of the caterpillar chain.

A twenty-first preferred embodiment includes a method in accordance with the twentieth preferred embodiment, comprising: determining the position of the construction machine, and measuring the distance covered by the construction machine using the detected movement of the caterpillar chain and the determined positions of the construction machine.

A twenty-second preferred embodiment includes a method in accordance with the twenty-first preferred embodiment, wherein the position of the construction machine is determined using signals of a global navigation satellite system or a terrestrial system.

A twenty-third preferred embodiment includes a method in accordance with the twenty-first or twenty-second preferred embodiment, wherein measuring the overall distance covered by the construction machine includes correcting the distance having been detected using the movement of the caterpillar chain, by distance pieces determined using continuously determined position values of the construction machine.

A twenty-fourth preferred embodiment includes a method in accordance with the twenty-first, twenty-second or twenty-third preferred embodiment, comprising: determining whether a work tool of the construction machine is activated, and measuring the area processed by the construction machine using the detected movement of the caterpillar chain and the activation of the work tool.

A twenty-fifth preferred embodiment includes a method in accordance with the twenty-fourth preferred embodiment, wherein determining whether a work tool of the construction machine is activated, includes detecting an acceleration of the work tool.

Although some aspects have been described in relation to a device, it is to be understood that these aspects also represent a description of the corresponding method such that a block or an element of a device is to be understood also to be a corresponding method step or feature of a method step. In analogy, aspects having been described in relation to or as a method step also represent a description of a corresponding block or detail or feature of a corresponding device.

While this invention has been described in terms of several preferred embodiments, there are alterations, permutations, and equivalents which will be apparent to others skilled in the art and which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

The invention claimed is:

1. A device for measuring a distance in a construction machine comprising a caterpillar chain drive, comprising:
at least one contactless sensor for being arranged at a chassis of the construction machine such that the contactless sensor is directed to a caterpillar chain of the caterpillar chain drive of the construction machine, wherein, when the construction machine moves, the contactless sensor alternatingly detects chain links of the caterpillar chain and gaps between the chain links of the caterpillar chain, and generates first signals in response to detection of the chain links and second signals in response to detection of the gaps;
a controller connected to the contactless sensor, wherein the controller determines a distance traveled by the construction machine by summing a set length of each of the chain links and a set length of each of the gaps in response to the first signals and the second signals received by the contactless sensor; and
at least one position determiner to determine a position of the construction machine using signals of a global navigation satellite system or a terrestrial system,
wherein the controller corrects, at predetermined distances traveled by the construction machine, the set length of each of the chain links or the set length of each of the gaps using the position of the construction machine obtained from at least one position determiner, the corrected length of each of the chain links or the corrected length of each of the gaps being used for a subsequent calculation of a distance traveled by the construction machine.

2. The device in accordance with claim 1, wherein the position determiner is part of the controller or part of an operating and display device of the construction machine to which the controller is to be connected.

3. The device in accordance with claim 1, comprising at least one acceleration sensor, arranged at a work tool of the construction machine, to detect an operating state of the work tool.

4. The device in accordance with claim 3, wherein in response to the acceleration sensor detecting an operating state of the work tool, the controller determines an area processed by the construction machine using a current mounting width of a work tool of the construction machine and the distance traveled by the construction machine.

5. The device in accordance with claim 1, wherein the contactless sensor comprises at least two sensor heads in a casing.

6. The device in accordance with claim 1, comprising at least two contactless sensors arranged on one side of the construction machine with a spacing to one another, wherein a first contactless sensor is directed to a first region of the caterpillar chain and a second contactless sensor is directed to a second region of the caterpillar chain.

7. The device in accordance with claim 1, comprising at least two contactless sensors, wherein a first contactless sensor is arranged on a first side of the construction machine, and wherein a second contactless sensor is arranged on a second side of the construction machine opposite the first side,
wherein the controller determines, using the signals from the first contactless sensor and from the second contactless sensor, whether the construction machine travels straight ahead or makes a bend.

8. The device in accordance with claim 1, comprising:
a bus system which connects the contactless sensor and the controller, and
an interface to connect the bus system to a computer unit, an operating and display device, or a communicator of the construction machine.

9. A construction machine comprising:
a caterpillar chain drive;
a chassis; and
a device in accordance with claim 1, arranged detachably at the construction machine.

10. A method for measuring a distance in a construction machine comprising a caterpillar chain drive, comprising:
detecting a movement of a caterpillar chain of the caterpillar chain drive of the construction machine in a contactless manner, wherein detecting the movement includes alternatingly detecting chain links of the caterpillar chain and gaps between the chain links of the caterpillar chain, and generating first signals in response to detection of the chain links and second signals in response to detection of the gaps;
determining a distance traveled by the construction machine by summing a set length of each of the chain links and a set length of each of the gaps in response to the first and second signals received by the contactless sensor;
determining a position of the construction machine using signals of a global navigation satellite system or a terrestrial system; and
correcting, at predetermined distances traveled by the construction machine, the set length of each of the chain links and the set length of each of the gaps using the position of the construction machine obtained, and using the corrected length of each of the chain links or the corrected length of each of the gaps for a subsequent calculation of a distance traveled by the construction machine.

11. The method in accordance with claim 10, comprising:
determining whether a work tool of the construction machine is activated, and
in response to determining that the work tool of the construction machine is activated, determining an area processed by the construction machine using a current mounting width of a work tool of the construction machine and the distance traveled by the construction machine.

* * * * *